(12) United States Patent
Sun et al.

(10) Patent No.: US 11,456,773 B2
(45) Date of Patent: Sep. 27, 2022

(54) INSTRUMENT, SYSTEM, AND METHOD FOR LOCATING A LEAKAGE SOURCE

(71) Applicant: VIAVI SOLUTIONS INC., San Jose, CA (US)

(72) Inventors: Dexin Sun, Indianapolis, IN (US); Terry W. Bush, Greenwood, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/952,993

(22) Filed: Nov. 19, 2020

(65) Prior Publication Data

US 2021/0075469 A1 Mar. 11, 2021

Related U.S. Application Data

(63) Continuation of application No. 16/921,870, filed on Jul. 6, 2020, now abandoned, which is a continuation of application No. 16/183,487, filed on Nov. 7, 2018, now Pat. No. 10,707,917.

(60) Provisional application No. 62/583,247, filed on Nov. 8, 2017, provisional application No. 62/660,645, filed on Apr. 20, 2018.

(51) Int. Cl.
| | |
|---|---|
| *H04B 3/46* | (2015.01) |
| *H01Q 5/30* | (2015.01) |
| *H01Q 1/22* | (2006.01) |
| *H01Q 5/50* | (2015.01) |
| *H01Q 9/02* | (2006.01) |
| *H01Q 7/00* | (2006.01) |
| *H01Q 9/40* | (2006.01) |

(52) U.S. Cl.
CPC ............. *H04B 3/46* (2013.01); *H01Q 1/2233* (2013.01); *H01Q 5/30* (2015.01); *H01Q 5/50* (2015.01); *H01Q 7/00* (2013.01); *H01Q 9/02* (2013.01); *H01Q 9/40* (2013.01)

(58) Field of Classification Search
CPC ............ H01Q 5/30; H01Q 5/314; H01Q 5/50; H01Q 1/2233; H01Q 7/00; H01Q 9/02; H01Q 9/40; H04B 3/46
See application file for complete search history.

(56) References Cited

U.S. PATENT DOCUMENTS

| | | |
|---|---|---|
| 4,072,899 A | 2/1978 | Shimp |
| 5,493,210 A | 2/1996 | Orndorff et al. |
| 5,585,842 A | 12/1996 | Chappell et al. |
| 5,608,428 A | 3/1997 | Bush |
| 5,982,165 A | 11/1999 | Boyer et al. |
| 6,018,358 A | 1/2000 | Bush |
| 6,112,059 A | 8/2000 | Schwent et al. |
| 6,272,150 B1 | 8/2001 | Hrastar et al. |
| 6,278,485 B1 | 8/2001 | Franchville et al. |
| 6,310,646 B1 | 10/2001 | Shi et al. |
| 6,425,132 B1 | 7/2002 | Chappell |

(Continued)

FOREIGN PATENT DOCUMENTS

| | | |
|---|---|---|
| WO | WO 2013/003301 | 1/2013 |
| WO | WO 2014/062649 | 4/2014 |

OTHER PUBLICATIONS

Viavi "OneExpert CATV Sweep and Maintenance System", pp. 1-12, (2016).

*Primary Examiner* — Sophia Vlahos
(74) *Attorney, Agent, or Firm* — DLA Piper LLP (US)

(57) ABSTRACT

An instrument system for locating leakage at a subscriber's premises is disclosed.

13 Claims, 7 Drawing Sheets

(56) References Cited

U.S. PATENT DOCUMENTS

| | | |
|---|---|---|
| 6,611,150 B1 | 8/2003 | Stevens |
| 6,724,808 B1 * | 4/2004 | Ohshima ............... H04W 52/42 |
| | | 375/147 |
| 6,804,826 B1 | 10/2004 | Bush et al. |
| 6,833,859 B1 | 12/2004 | Schneider et al. |
| 6,877,166 B1 | 4/2005 | Roeck et al. |
| 7,245,882 B1 * | 7/2007 | McFarland ............. H04B 1/18 |
| | | 455/73 |
| 7,584,496 B2 | 9/2009 | Zinevitch |
| 7,647,391 B1 | 1/2010 | Jean et al. |
| 8,143,900 B2 | 3/2012 | Shimp et al. |
| 8,146,125 B2 | 3/2012 | Grinkemeyer et al. |
| 8,161,517 B2 | 4/2012 | Bowen et al. |
| 8,239,903 B1 | 8/2012 | Campagna et al. |
| 8,650,605 B2 | 2/2014 | Zinevich |
| 8,811,148 B2 | 8/2014 | Yang et al. |
| 8,869,223 B2 | 10/2014 | Menna et al. |
| 8,957,827 B1 * | 2/2015 | Lee ....................... H01Q 5/378 |
| | | 343/702 |
| 9,453,916 B2 | 9/2016 | Riley |
| 9,667,956 B2 | 5/2017 | Bush et al. |
| 10,056,922 B1 | 8/2018 | Tsvelykh et al. |
| 10,110,888 B2 | 10/2018 | Bush et al. |
| 10,116,930 B2 | 10/2018 | Bush et al. |
| 10,707,917 B2 * | 7/2020 | Sun ....................... H01Q 1/2233 |
| 2002/0019983 A1 | 2/2002 | Emsley et al. |
| 2002/0095686 A1 | 7/2002 | Shi et al. |
| 2002/0194547 A1 | 12/2002 | Christensen et al. |
| 2003/0022645 A1 | 1/2003 | Runzo |
| 2003/0033609 A1 | 2/2003 | Zimmerman |
| 2003/0076194 A1 * | 4/2003 | Machui ................... H04B 1/52 |
| | | 333/133 |
| 2003/0134599 A1 | 7/2003 | Pangrac et al. |
| 2005/0034170 A1 | 2/2005 | Bush et al. |
| 2005/0141406 A1 | 6/2005 | Maltsev et al. |
| 2005/0226164 A1 | 10/2005 | Williams |
| 2008/0009754 A1 | 1/2008 | Chang |
| 2008/0040764 A1 | 2/2008 | Weinstein et al. |
| 2008/0064349 A1 | 3/2008 | Flask et al. |
| 2008/0198017 A1 | 8/2008 | Hesselbarth et al. |
| 2009/0064248 A1 | 3/2009 | Kwan et al. |
| 2010/0266000 A1 | 10/2010 | Forimovich et al. |
| 2011/0267474 A1 | 11/2011 | Sala et al. |
| 2012/0042213 A1 | 2/2012 | Zimmerman |
| 2012/0078565 A1 | 3/2012 | Qian et al. |
| 2012/0086597 A1 | 4/2012 | Sin |
| 2012/0195239 A1 | 8/2012 | Belitzer et al. |
| 2012/0257661 A1 | 10/2012 | Murphy et al. |
| 2013/0003565 A1 | 1/2013 | Gotwals et al. |
| 2014/0047489 A1 | 2/2014 | Nielsen et al. |
| 2014/0122085 A1 | 5/2014 | Piety et al. |
| 2014/0184443 A1 | 7/2014 | Riley et al. |
| 2015/0035993 A1 | 2/2015 | James et al. |
| 2015/0264343 A1 | 9/2015 | Bush et al. |
| 2017/0251207 A1 | 8/2017 | Bush et al. |

\* cited by examiner

INSTRUMENT, SYSTEM, AND METHOD FOR LOCATING A LEAKAGE SOURCE

This application is a continuation of U.S. application Ser. No. 16/921,870, filed on Jul. 6, 2020, which is a continuation of U.S. application Ser. No. 16/183,487, filed Nov. 7, 2018, which claims priority under 35 U.S.C. § 119 to U.S. Provisional Patent Application Ser. No. 62/583,247, filed on Nov. 8, 2017, and U.S. Provisional Patent Application Ser. No. 62/660,645, filed on Apr. 20, 2018. Each of those applications is expressly incorporated herein by reference.

TECHNICAL FIELD

The present disclosure relates generally to data-over-cable or cable network system testing, and, more particularly, to instruments and methods for detecting leakage from a cable network system.

BACKGROUND

Most cable network systems are coaxial-based broadband access systems that may take the form of all-coax network systems, hybrid fiber coax (HFC) network systems, or RF over glass (RFOG) network systems. Cable network system designs typically use a tree-and-branch architecture that permits bidirectional data transmission, including Internet Protocol (IP) traffic between the cable system head-end and customer locations. There is a forward or downstream signal path (from the cable system head-end to the customer location) and a return or upstream signal path (from the customer location back to the cable system head-end). The upstream and the downstream signals occupy separate frequency bands. In the United States, the frequency range of the upstream band is from 5 MHz to 42 MHz, 5 MHz to 65 MHz, 5 MHz to 85 MHz, or 5 MHz to 204 MHz, while the downstream frequency band is positioned in a range above the upstream frequency band.

Customer locations may include, for example, cable network system (e.g., CATV) subscriber's premises. Typical signals coming from a CATV installation at the subscriber's premises include, for example, set top box DVR/On Demand requests, test equipment data channels, and Internet Protocol output cable modem carriers defined by the Data Over Cable Service Interface Specification ("DOCSIS"), which is one communication standard for bidirectional data transport over a cable network system.

Egress or leakage from the cable network system results from flaws in the cable network system that provide points of ingress for noise, which can reduce the quality of service of the system. Service operators have utilized two basic types of leakage detection gear to locate such points of ingress. One type of gear utilizes a signal level meter with an antenna designed to receive signals in the cable network system band. A maintenance/service technician walks around a subscriber's premises monitoring the signal level meter to identify flaws in the wiring and network devices at the subscriber's premises.

The other type of gear is so-called "truck-mounted" units, which are mounted in vehicles that are driven along the data lines and nodes of the cable network system, generally by maintenance/service technicians, to monitor leakage along the cable network system.

and associated instrumentation for locating leakage is shown and described in U.S. Patent App. Pub. No. 2017/0251207, which is expressly incorporated herein by reference.

SUMMARY

According to one aspect of the disclosure, an instrument system for locating leakage at a subscriber's premises is disclosed. The instrument system includes a transmitter operable to generate signals in a number of different frequency sub-bands across a frequency range of about 100 MHz to about 1.2 GHz and an antenna assembly operable to receive the signals. The antenna assembly may be coupled to a signal level meter or other test instrument to scan the frequency sub-bands, locate the signals, and determine the leakage amplitude and frequency.

According to another aspect, the instrument system includes an antenna assembly operable to receive signals in multiple frequency sub-bands and supply those signals to a signal level meter or other test instrument to scan the frequency sub-bands, locate the signals, and determine the leakage amplitude and frequency.

BRIEF DESCRIPTION OF THE DRAWINGS

The detailed description particularly refers to the following figures, in which.

DETAILED DESCRIPTION OF THE DRAWINGS

Figure 1:
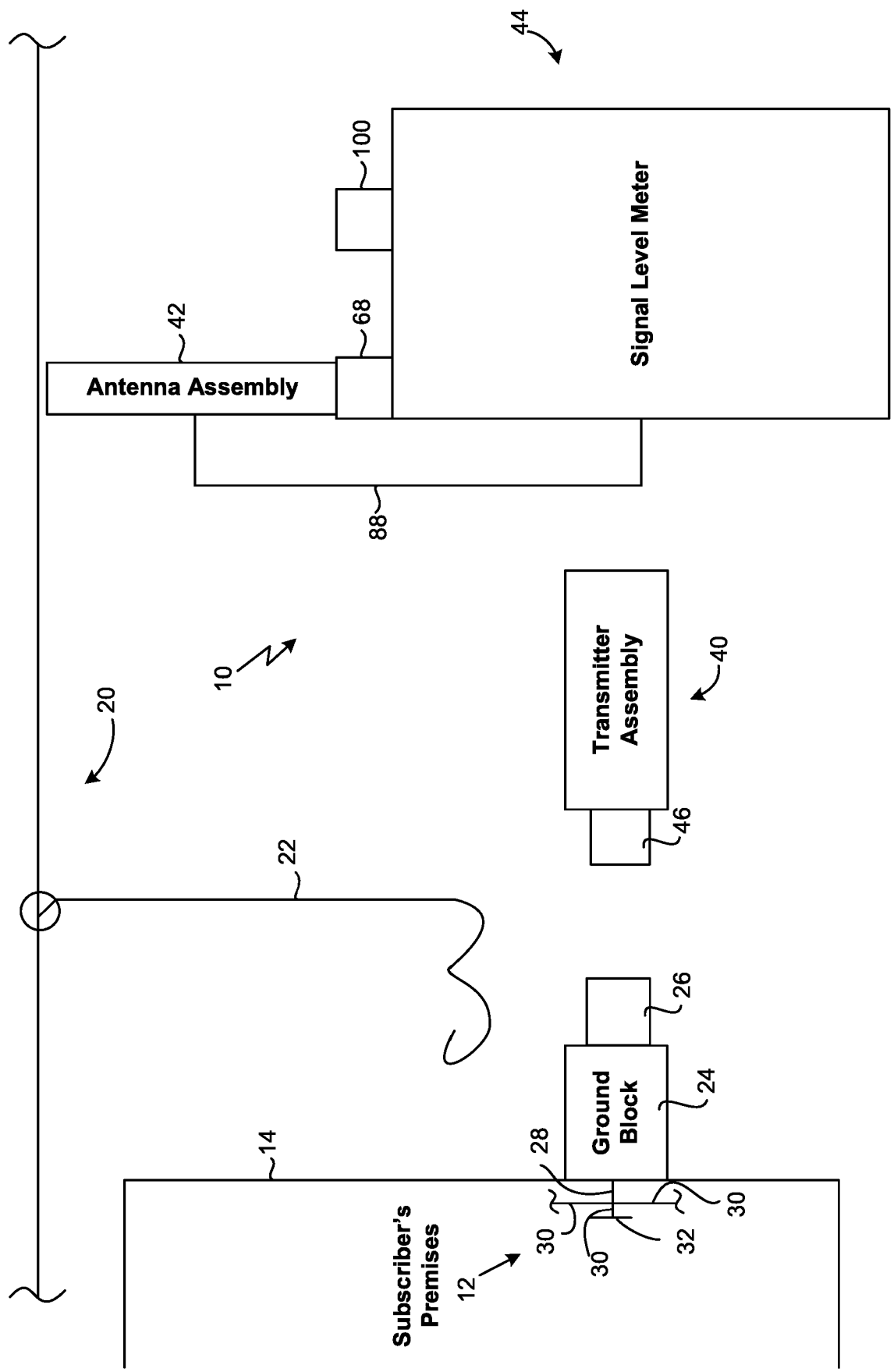
FIG. 1 is a block diagram illustrating a cable network system, a subscriber's premises, and an instrument system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, an instrument system 10 for use in locating leakage in a CATV installation 12 at a subscriber's premises 14 is shown. In the illustrative embodiment, the cable network system 20 may be connected to a subscriber's premises 14 via a data line or cable 22 to provide signals including programming material to the subscriber. The cable network system 20 includes a head end (not shown) where programming material is obtained and modulated onto appropriate carriers for distribution to a number of subscriber's premises 14. Subscribers' premises may include offices, homes, apartments, or other spaces at which CATV content is desired. The carriers may be combined for distribution downstream to subscribers over what is typically referred to as the forward path. Signals going upstream from subscribers' premises are typically routed in what is called the return path.

The cable 22 may be connected to the subscriber's premises 14 at a ground block 24. In the illustrative embodiment, the cable 22 is a coaxial cable. In other embodiment, the cable may include coaxial cable and/or optical fiber that transport the CATV signals. In some embodiments, the CATV signals are transported as radio frequencies (RF). The signals may also be transported in hybrid systems including optical transmission portions in which the RF signals are converted to light for fiber optic transmission over some portions of the signal path and as RF signals over other portions of the signal path.

The ground block 24 is illustratively coupled to the side of the subscriber's premises 14 and includes a connector 26 configured to be couple to the cable 22. From the ground block 24, a cable 28 enters the house and connects to the CATV installation 12. The CATV installation 12 defines a "tree and branch" topology with the different branches 30 connecting various outlets 32 to the ground block 24.

The instrument system 10 for use in locating leakage in the CATV installation 12 includes a transmitter assembly 40, an antenna assembly 42 configured to receive signals generated by the transmitter assembly 40, and a signal level meter 44 configured to be coupled to the antenna assembly 42. As shown in FIG. 1, the transmitter assembly includes a connector 46 that is configured to be coupled to the connector 26 of the ground block 24 when the cable 22 is disconnected. In the illustrative embodiment, the connectors 26, 46 are F-connectors and may be male or female connectors. As described in greater detail below, the transmitter assembly 40 is operable to generate signals in a number of frequency sub-bands over a frequency range of about 100 MHz to about 1.2 GHz, and the antenna assembly 42 includes circuitry tuned to each frequency sub-band to receive signals generated by the transmitter assembly 40 over the frequency range.

Figure 2:
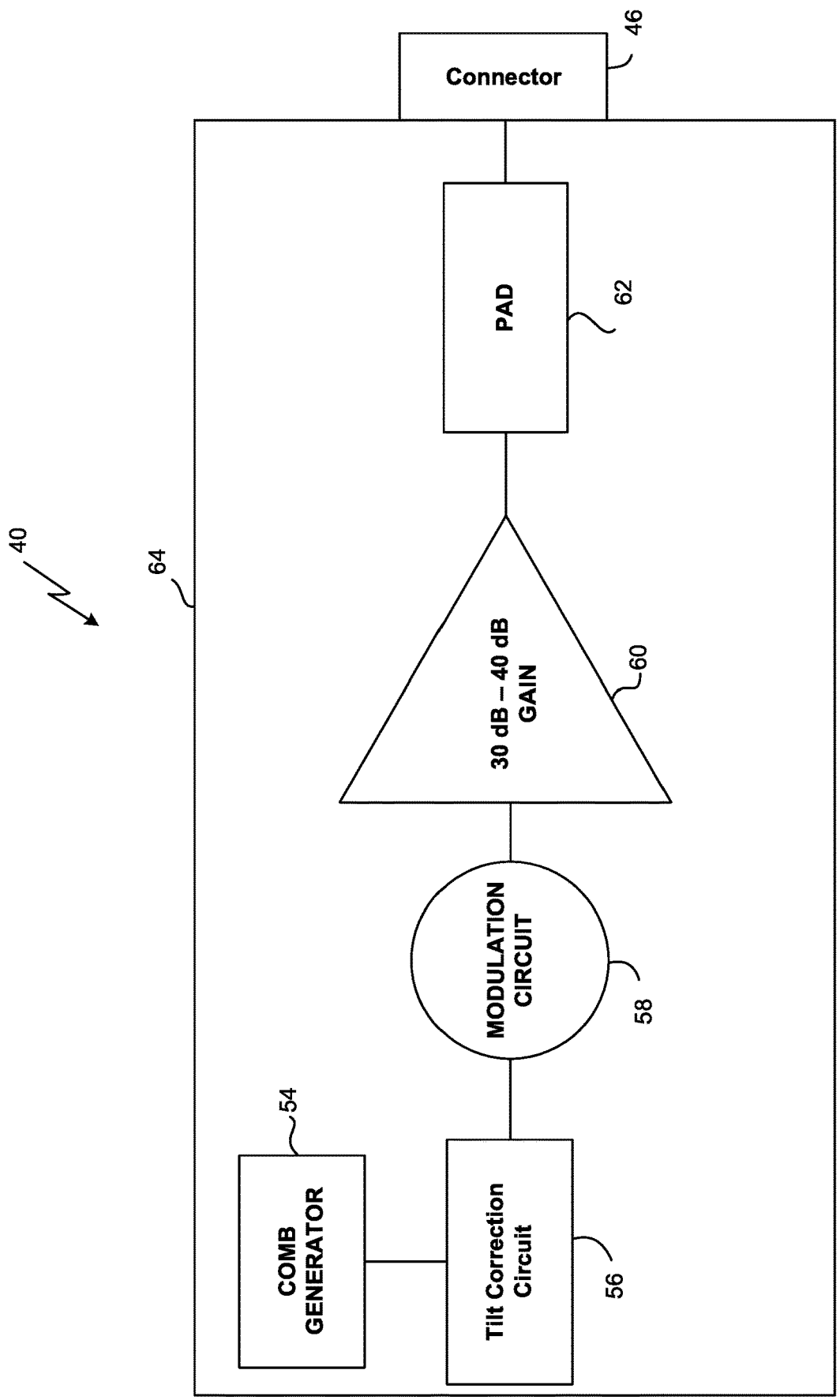
FIG. 2 is a block diagram schematic of a transmitter assembly of the instrument system of FIG. 1.

Referring now to FIG. 2, the transmitter assembly 40 includes a number of electrical circuits 52 to generate signals that are transmitted via the connector 46. In the illustrative embodiment, the electrical circuits 52 of the transmitter assembly 40 include a comb generator 54 to produce output signals at multiple harmonics. In the illustrative embodiment, the harmonics output by the comb generator 54 includes signals at multiples of about 138 MHz (i.e., 138 MHz, 276 MHz, 414 MHz, 552 MHz . . . ) over a frequency range of about 138 MHz to about 1.2 GHz.

As used herein, the term "about" refers to fifteen percent tolerance based on manufacturing variation and other design criteria. As such, the phrase "about 138 MHz," for example, encompasses 117.2 MHz, while the phrase "about 1.2 GHz" includes 1380 MHz. It should be appreciated that in other embodiments signals may be generated at other harmonics, such as, for example, every 100 MHz over the frequency range.

The output of the comb generator 54 is connected to the input of a tilt correction circuit 56 to adjust the signals provided by the comb generator to make them substantially flat across the frequency range.

The output of the tilt correction circuit 56 is connected to a modulation circuit 58. The modulation circuit 58 is operable to modulate the output signals from the tilt correction circuit 56 with a tag signal. In the illustrative embodiment, the tag signal has a frequency of about 20 Hz at −3 dB. One approach to adding a tag signal is shown and described in U.S. Pat. No. 5,608,428, which is expressly incorporated herein by reference. It should be appreciated that in other embodiments the modulation circuit may include a variable modulator to permit the technician to adjust the frequency of the tag signal.

As shown in FIG. 2, the transmitter assembly 40 also includes an amplifier 60 to add gain to the signals output from the modulation circuit 58. In the illustrative embodiment, the amplifier 60 is configured to add gain in a range of about 30 dB to about 40 dB.

The output of the amplifier 60 is connected to the input of a PAD 62. The PAD 62 is configured to be adjusted by the technician to add a high power offset to the signals output from the amplifier 60. In the illustrative embodiment, PAD is configured to permit the technician to add between about +40 dBmV to about +60 dBmV or about zero dB to about 20 dB. In other embodiments, the PAD is configured to permit the technician to add between +40 dBmV to about +80 dBmV or about zero dB to about 40 dB.

The transmitter assembly 40 includes an outer casing 64 that is shielded to prevent the circuits 52 from radiating and transmitting signals through the air that might be detected by the antenna assembly 42 and the signal level meter 44. As shown in FIG. 2, the connector 46 is attached to the outer casing 64 and is configured to output the comb-generated signals to, for example, the ground block 24 when connected to connector 26.

As described above, the connector 46 is configured to be coupled to connector 26 of the ground block 24 to physically connect the transmitter assembly 40 with the ground block 24. With the transmitter assembly connected to the ground block, a technician may energize the transmitter assembly 40 to supply the comb-generated signals to the CATV installation 12 at the subscriber's premises 14 via the ground block 24. In the CATV installation 12, there may be some one or more sources of what is known as "flat" (that is, non-frequency dependent, non-distance dependent) loss, for example, (a) splitter(s), (a) tap(s) and so on. A four-way splitter might have a loss in the range of −7 dB. A tap might have a loss in the range of −3 dB. In addition, there is line loss for the length of coaxial cable between the ground block and a flaw or "leak" in the cable. This loss typically is frequency dependent and might be, for example, 6 dB/100 ft (about 30.5 m) for about 138 MHz and 10 dB/30.5 m for about 750 MHz. If such leakage sources are present in the CATV installation 12, the comb-generated signals supplied by the transmitter assembly 40 via the ground block 24 will radiate from those leakage sources. As described in greater detail below, the antenna assembly 42 may be used with the signal level meter 44 to detect these signals and thereby locate the leakage sources in the CATV installation 12.

Figure 3:
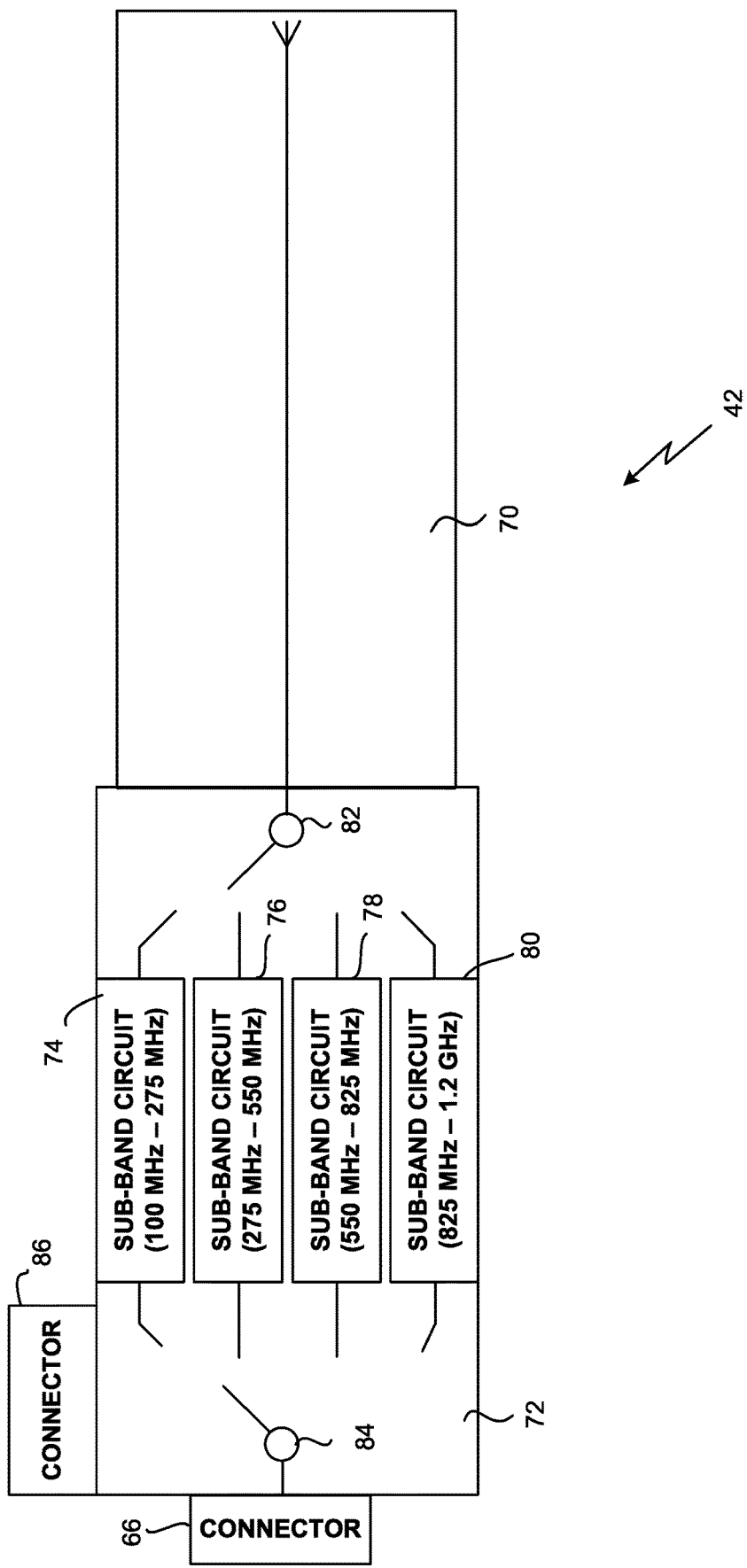
FIG. 3 is a block diagram schematic of one embodiment of an antenna assembly of the instrument system of FIG. 1.

Referring now to FIG. 3, the antenna assembly 42 includes a connector 66 configured to be coupled to a connector 68 of the signal level meter 44. The antenna assembly 42 also includes an antenna 70 configured to receive signals in a range of about 100 MHz to about 1.2 GHz. The antenna assembly 42 includes a circuit board assembly 72 that is coupled to the antenna 70 and the connector 66. In the illustrative embodiment, the circuit board assembly 72 includes a number of sub-band circuits 74, 76, 78, 80 that correspond to the frequency bands of the comb-generated signals provided by the transmitter assembly 40. It should be appreciated that each of the circuits 74, 76, 78, 80 may be a digital tunable narrow band circuit or passive broad band circuit. A pair of switches 82, 84 are operable to selectively connect each of the circuits 74, 76, 78, 80 to the connector 66 and the antenna 70 to supply signals to the signal level meter 44.

As shown in FIG. 3, the frequency range for the circuit 74 is about 100 MHz to about 275 MHz and therefore corresponds to the comb-generated signals at about 138 MHz. The frequency range for the circuit 76 is about 275 MHz to about 550 MHz and therefore corresponds to the comb-generated signals at about 276 MHz and 414 MHz. The frequency range for the circuit 78 is about 550 MHz to about 825 MHz and therefore corresponds to the comb-generated signals at about 552 MHz and 690 MHz. The frequency range for the circuit 80 is about 825 MHz to about 1.2 GHz and therefore corresponds to the comb-generated signal at about 828 MHz, 966 MHz, and 1,104 MHz. It should be appreciated that in other embodiments the transmitter assembly be configured to receive additional or fewer sub-bands depending on, for example, the overall frequency range.

The antenna assembly 42 also includes another connector or port 86 configured to receive a control and power cable 88 (see FIG. 1) to connect the signal level meter 44 to the circuit board assembly 72 and thereby permit the technician to provide power to, and control the operation of, the switches 82, 84 and the circuits 74, 76, 78, 80.

Figure 4:
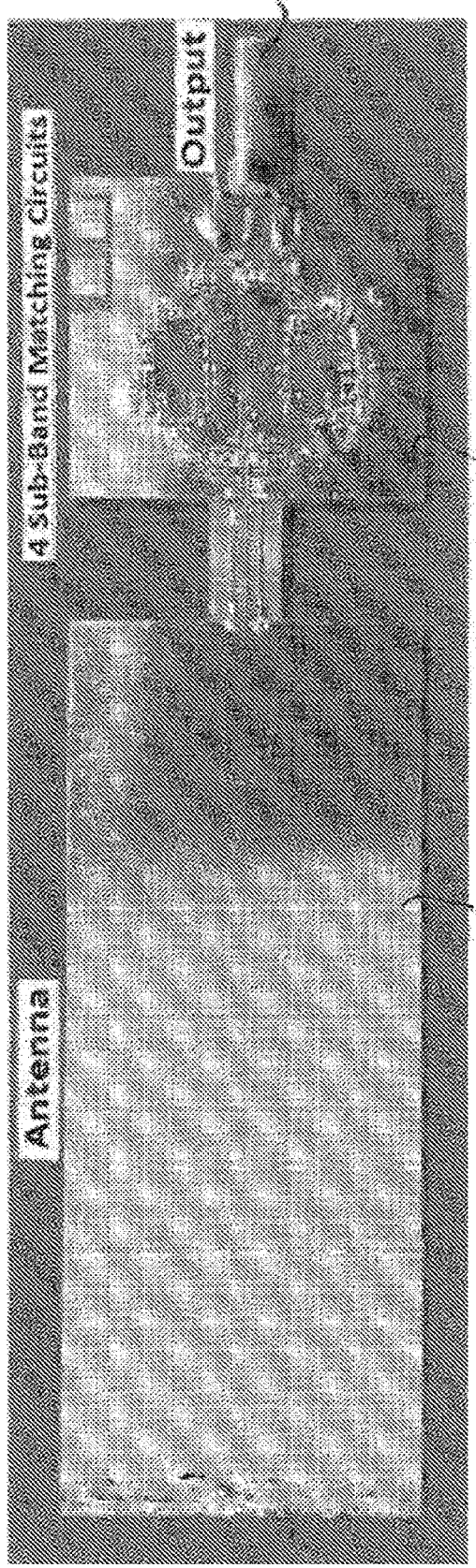
FIG. 4 is an illustration of the antenna assembly of FIG. 3.

Referring now to FIG. 4, an exemplary antenna assembly 42 is shown in greater detail. The antenna assembly 42 covers the frequency range from 100 MHz to 1200 MHz with a minimum gain higher than −15 dBi and return loss better than 8 dB. As shown in FIG. 2, the antenna 70 of the antenna assembly 42 is fabricated on a FR4 PCB (dielectric constant is 4.6) with the size of 3 in×6 in. The switches 82, 84 are illustratively 1×4 switches to connect the circuits 74, 76, 78, 80 and convert antenna impedance to output a 75 ohm (F connector) impedance. In other embodiments, 1×4 combiners or multiplexers may be used in place of switches or combination of multi-antennas like a patch monopole antenna and a loaded loop antenna, etc. may be used as a wide band antenna, if the performance is acceptable based on the system requirements.

As described above, each of the circuits 74, 76, 78, 80 may be a passive band circuit or a tunable band circuit with lower insertion loss. In the illustrative embodiment, the circuits 78, 80 are passive matching circuits, and the circuits 74, 76 are tunable matching circuits. The circuit 74 may take the form of a 250 nH inductor in series with a capacitor in a range of about 1.3 pF to about 10 pF. When L=250 nH and capacitor C changes from 1.3 pF to 10 pF, the matching frequency will move from about 100 MHz to about 275 MHz, thereby permitting the antenna assembly 42 to receive the comb-generated signal at about 138 MHz. The variable capacitor may be a set of PIN diodes with different capacitor values, a varactor diode, or digital tunable capacitor (DTC). In some embodiments, the variable capacitor may be a Peregrine DTC PE64102 (for the 100 MHz to 275 MHz range). The variable capacitor (and hence the circuit 74) may be controlled by a signal received from the signal level meter 44 via the control cable 88.

The circuit 76 may take the form of a 250 nH inductor in series with a capacitor in a range of about 0.9 pF to about 4.6 pF. When L=250 nH and the capacitor C changes from 0.9 pF to 4.6 pF, the matching frequency will move from about 275 MHz to about 550 MHz. In some embodiments, the variable capacitor may be a Peregrine DTC PE64906 (for the 275 MHz to 550 MHz range). As described above, the variable capacitor (and hence the circuit 76) may be controlled by signal received from the signal level meter 44 via the control cable 88.

It should be appreciated that since the size of the antenna 70 in FIG. 4 is much smaller than the wavelength (A) at low frequency (for example, 6 in is about A/20 of 100 MHz), the matching circuits 74, 76, 78, 80 play an important role for proper gain over the entire frequency band of the antenna assembly 42.

Figure 5:
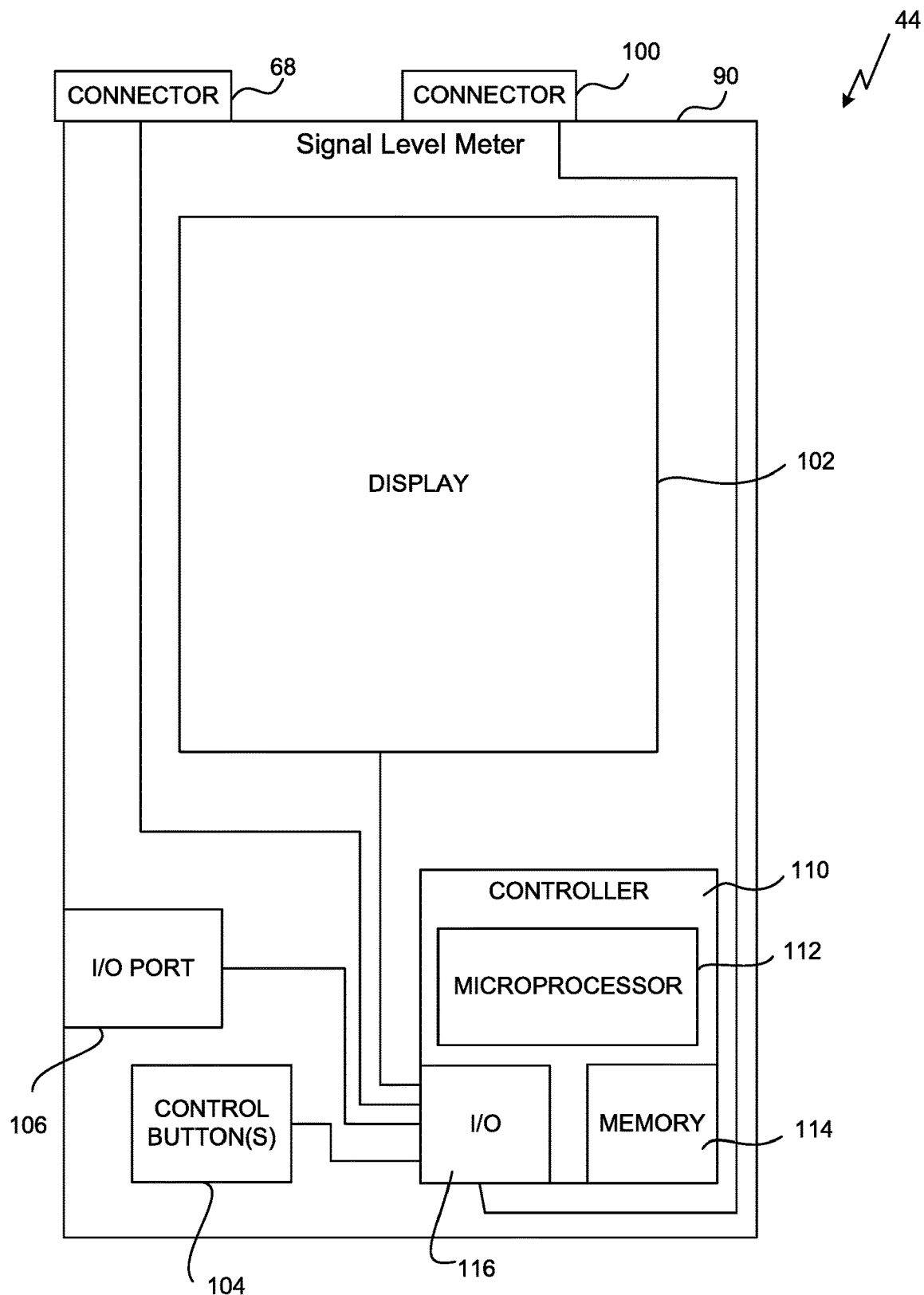
FIG. 5 is a block diagram schematic of a signal level meter of the instrument system of FIG. 1.

Referring now to FIG. 5, the signal level meter 44 includes an outer casing 90 that houses various electronic components for analyzing the signals received via the connector 68 and other connectors, including, for example, the connector 100. In the illustrative embodiment, the meter 44 includes a touchscreen display 102 and various control buttons 104 that may be utilized by the technician to operate the meter 44 and analyze signals received by it. The meter 44 also includes an Input/Output (I/O) port 106 such as, for example, a USB port, that is configured to be connected to the control cable 88 to control the operation of the antenna assembly 42. The meter 44 may also include a speaker or other device operable to generate audible signals.

The meter 44 also includes an electronic control unit (ECU) or "electronic controller" 110, which is configured to control the operation of the meter 44. The electronic controller 110 includes a Digital Signal Processor (DSP), but in other embodiments the controller 110 may include one or more Field Programmable Gate Arrays (FPGA) and Cable Modem Chips. Each of the components described above (e.g., the display 102, connectors 68, 100, control buttons 104, I/O port 106, and so forth) is connected to the electronic controller 110 via a number of communication links such as printed circuit board traces, wires, cables, and the like, which are connected to an interface circuit 116, as shown in FIG. 5.

The electronic controller 110 includes, amongst other components customarily included in such devices, a processor such as a microprocessor 112 and a memory device 114 such as a programmable read-only memory device ("PROM") including erasable PROM's (EPROM's or EEPROM's). The memory device 114 is provided to store, amongst other things, instructions in the form of, for example, a software routine (or routines) which, when executed by the microprocessor 112, allows the electronic controller 110 to control operation of the meter 44 (and hence, for example, the antenna assembly 42). In the illustrative embodiment, the memory device 114 has stored therein a number of normalization tables associated with the range of possible drop levels of the subscribers' premises 14 and the range of possible transmit levels of the transmitter assembly 40.

Figure 6:
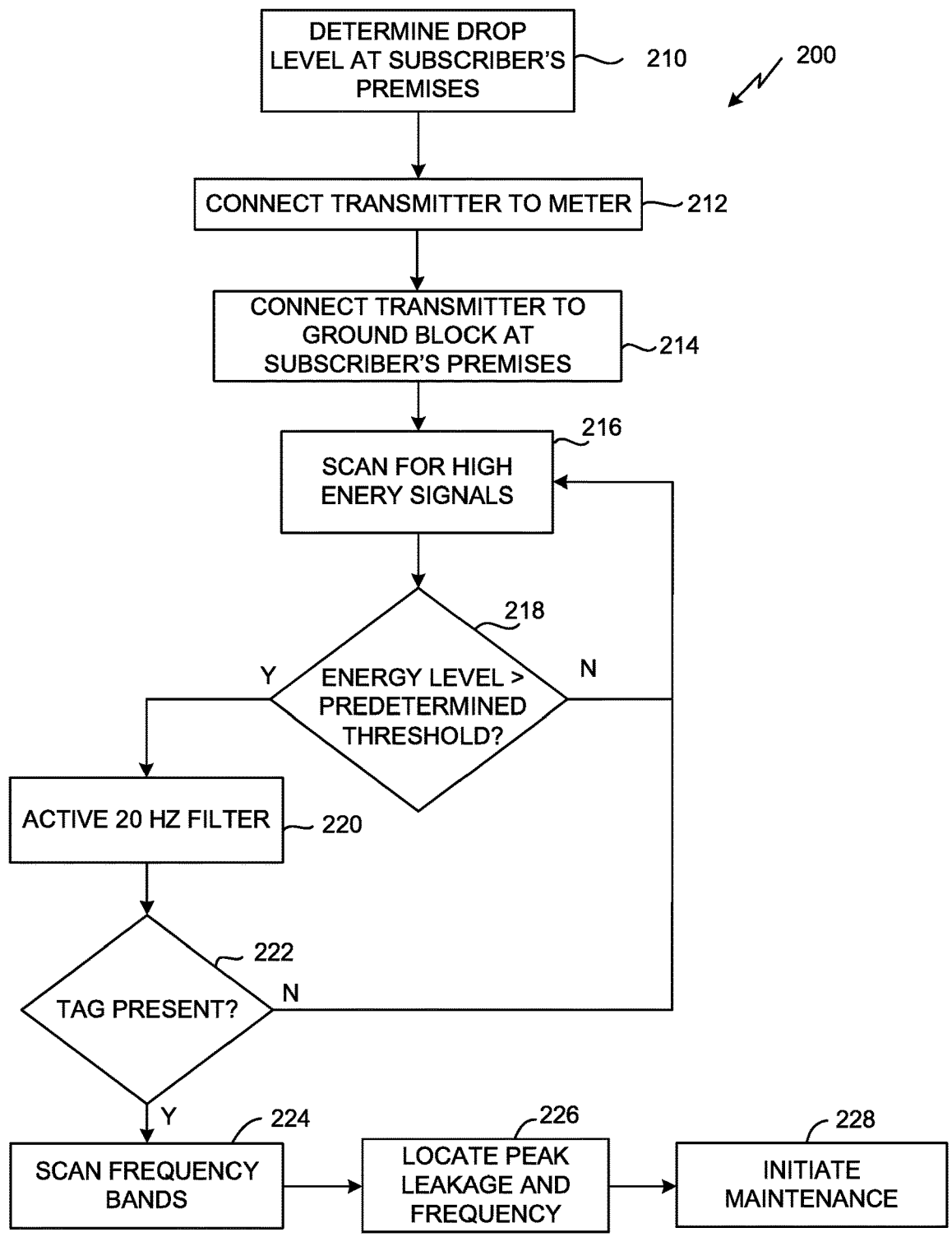
FIG. 6 is a procedure for locating leakage in the subscriber's premises using the instrument system of FIG. 1.

Referring now to FIG. 6, an exemplary procedure 200 for locating a leakage in the CATV installation 12 of a subscriber's premises 14 is shown. The procedure 200 may begin in block 210 in which a technician may determine and record a drop level of the CATV installation 12. To do so, the technician may disconnect the cable 22 from the ground block 24. The technician may then connect the signal level meter 44 to the ground block 24 and operate the signal level meter 44 to record the drop level.

The procedure 200 may then proceed to block 212 in which the technician may determine the transmit level of the transmitter assembly 40. To do so, the technician may connect the transmitter assembly 40 the connector 100 of the signal level meter 44. The technician may then operate the signal level meter 44 to determine the transmit level associated with that particular transmitter assembly 40.

The transmit level and the drop level are stored in the memory device 114. Additionally, the technician may separately record in the memory device 114 the frequency response of the antenna assembly 42, which may be determined at the time of manufacture. The signal level meter 44 may utilize the antenna response, drop level, and transmit level to access the normalization tables stored in the memory device 114 and determine a correction that may be needed to adjust the operation of the signal level meter 44 to the specific configurations of the subscriber's CATV installation, the transmitter assembly, and the antenna assembly.

The procedure 200 may proceed to block 214 in which the technician disconnects the transmitter assembly 40 from the signal level meter 44 and connects the transmitter assembly 40 to the ground block 24, as described above. With the transmitter assembly 40 attached to the ground block 24, the technician may energize the transmitter assembly 40 to supply the comb-generated signals to the CATV installation 12 via the ground block 24. The technician may then walk around the subscriber's premises 14 with the antenna assembly 42 and the signal level meter 44 scanning for signals.

To do so, the procedure 200 may advance to block 216 in which the technician monitors the display 102 for high energy signals while walking around the subscriber's premises 14. In the illustrative embodiment, high energy signals may be in a range of approximately 0.45 mV/m of the corrected signal (i.e., the signal after the offsets, normalizations, and antenna corrections are subtracted out). If the technician determines the energy level is in the range (e.g., greater than 0.45 mV/m of the corrected signal) in block 218, the procedure 200 advances to block 220. If the energy level remains below the range, the technician may continue to walk around the subscriber's premises 14 scanning for high energy signals in block 216.

In block 220, the technician may operate the signal level meter 44 to apply a filter for the tag signal to the signal received via the antenna assembly 42. If the technician determines, by, for example, monitoring the display, that the signal level meter 44 has detected the tag signal at 20 Hz in block 222, the procedure may advance to block 224. If the tag signal is not present, the noise source is not related to leakage, and the technician may continue to walk around the subscriber's premises 14 scanning for high energy signals in block 216.

In block 224, the technician may operate the signal level meter 44 to selectively couple the circuits 74, 76, 78, 80 to the antenna 70 and the output connector 68 of the antenna assembly 42. As the circuits 74, 76, 78, 80 are coupled in turn to the antenna 70 and the output connector 68, signals in the various frequency sub-bands of the circuits 74, 76, 78, 80 are received by the signal level meter 44. In block 226, the technician reviews the signals associated with each of the frequency sub-bands, looking for the comb-generated signals associated with each sub-band and the amplitude of the leakage in each sub-band to identify the peak leakage signal and its frequency.

After locating the peak leakage signal across the 100 MHz to 1.2 GHz frequency range, the technician may begin maintenance of the CATV installation 12 in block 228, eliminating defects, shielding leakage sources, and taking other actions to reduce the peak leakage to an acceptable level to permit the CATV installation 12 to be connected to the cable network system 20.

Figure 7:
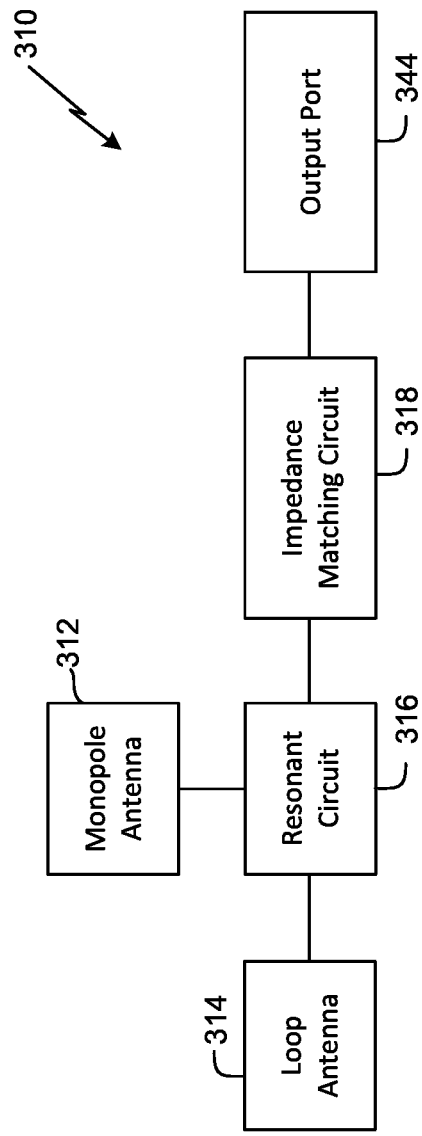
FIG. 7 is an illustration of another embodiment of an antenna assembly of the instrument system of FIG. 1.
Figure 8:
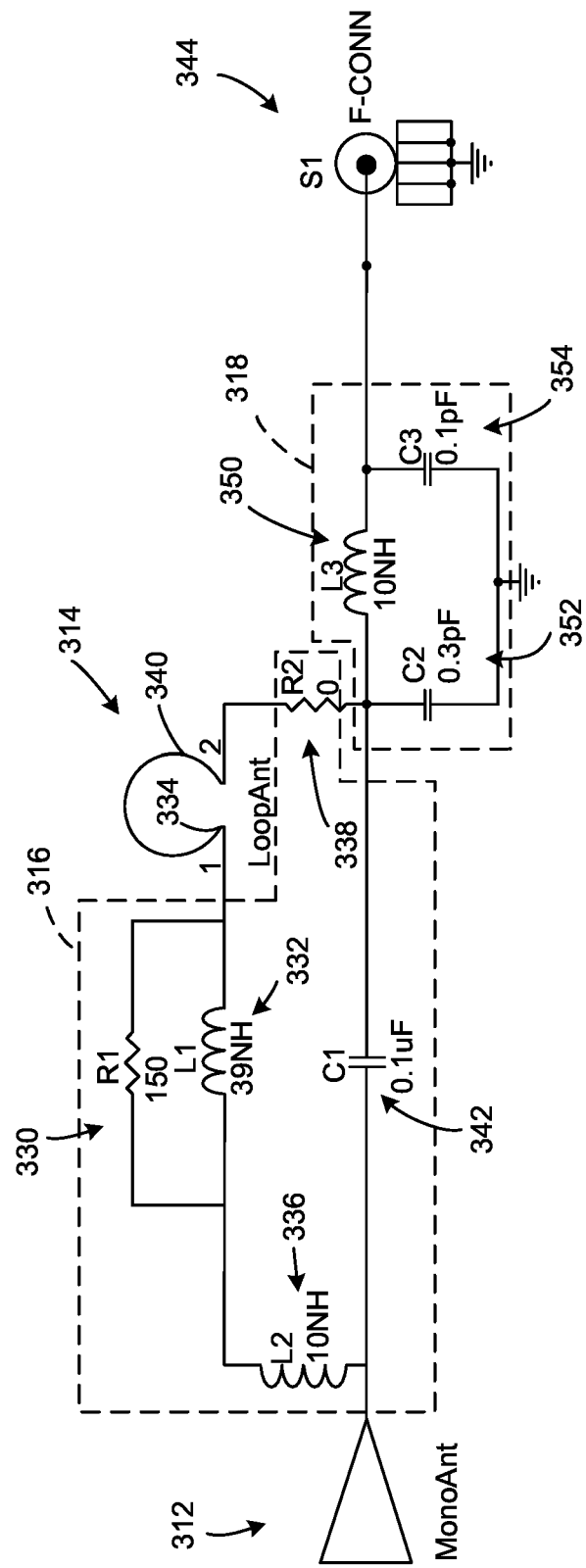
FIG. 8 is a block diagram schematic of the antenna assembly of FIG. 7.

Referring now to FIGS. 7-8, another embodiment of an antenna assembly 310 is shown. Like the antenna assembly 42, the antenna assembly 310 is configured to receive signals generated by the transmitter assembly 40 over the frequency range described above and includes a port 344 (i.e., F-connector) configured to be coupled to the signal level meter. As shown in FIG. 7, the antenna assembly 310 includes a monopole antenna 312 and a loop antenna 314. In the illustrative embodiment, the monopole antenna 312 is printed on a dielectric substrate and is configured to receive signals in a frequency range of 300 MHz to 1,200 MHz with 12 dB of gain tilt. The monopole antenna 312 is generally triangular-shaped in the illustrative embodiment to receive the wideband signal. In other embodiments, the antenna may be a metal cylinder or spherical shape to act as a wideband small antenna.

The loop antenna 314 is also printed on a dielectric substrate with a series inductor shunted with a resistor. As described in greater detail below, the loop antenna 314 is configured to introduce a low-Q impedance match at 150 MHz to extend the frequency range of antenna assembly 310 to 150 MHz. In the illustrative embodiment, the antenna assembly 310 has a minimum gain higher than −15 dBi over the frequency range of 150 MHz to 1,200 MHz and a return loss of better than 5 dB. It should be appreciated that in other embodiments the antenna assembly 310 may also include a short monopole antenna such as, for example, a rubber ducky antenna or rubber duck aerial to receive signals below 150 MHz.

As shown in FIG. 7, the loop antenna 314 is connected to a resonant circuit 316 configured to make the loop antenna 314 resonant at 150 MHz with a low Q. In the illustrative embodiment, Q is less than 10. The resonant circuit 316 and the monopole antenna 312 are connected to an impedance matching circuit 318 configured to match the signals from the circuit 316 and the monopole antenna 312 to the external load impedance of the antenna assembly 310.

Referring now to FIG. 8, exemplary circuits 316, 318 of the antenna assembly 310 are shown in greater detail. In the illustrative embodiment, the resonant circuit 316 includes a resistor 330 in parallel with an inductor 332, which are connected to an end 334 of the loop antenna 314. The resistor 330 and the inductor 332 are also connected to another inductor 336. The resistor 330 is a 150 Ohm resistor, the inductor 332 is a 39 nano-Henry inductor, and the inductor 336 is a 10 nano-Henry inductor in the illustrative embodiment.

The resonant circuit 316 also includes a resistor 338 that is connected to an end 340 of the loop antenna 314 and a capacitor 342 connected between the resistor 338 and the inductor 336. The resistor 338 has is 0 Ohm resistor, and the capacitor 342 is a 0.1 micro-farad capacitor. As described above, the resistor 330, inductor 332, inductor 336, capacitor 342, and resistor 338 make the loop antenna 314 resonant at 150 MHz with a low-Q loaded on the monopole antenna 312. It should be appreciated that the values of the inductor 336, capacitor 342, and resistor 338 may change to target a different resonant frequency.

The impedance matching circuit 318 is connected between the resonant circuit 316 and the output port 344 of the antenna assembly 310. The circuit 318 includes an inductor 350 and a pair of capacitors 352, 354. The inductor 350 is a 10 nano-Henry inductor, the capacitor 352 is a 0.3 pico-farad capacitor, and the capacitor 354 is a 0.1 pico-farad capacitor in the illustrative embodiment. As described above, the inductor 350 and capacitors 352, 354 are used for matching to the external load impedance of the antenna assembly 310.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. An antenna assembly for a test instrument, said antenna assembly comprising:
   an antenna comprising a monopole antenna and a loop antenna;
   a plurality of sub-band circuits connected to the antenna via a first switching circuit, each sub-band circuit being configured to receive signals from the antenna in a respective sub-band of multiple frequency sub-bands and supply the received signals via a second switching circuit to a signal level meter or other test instrument connected to the antenna assembly, the multiple frequency sub-bands comprising a frequency range divided into consecutive sub-band frequency ranges;
   a resonant circuit configured to make the loop antenna being resonant at about 150 MHz; and
   an impedance matching circuit connected to an output of the resonant circuit.

2. The antenna assembly of claim 1, wherein the plurality of sub-band circuits are selectively configured to receive signals in the frequency range of about 100 MHz to about 1.2 GHz.

3. The antenna assembly of claim 1, wherein the plurality of sub-band circuits comprise:
   a first sub-band circuit adapted to receive signals in a first sub-band frequency range of about 100 MHz to about 275 MHz;
   a second sub-band circuit adapted to receive signals in a second sub-band frequency range of about 275 MHz to about 550 MHz;
   a third sub-band circuit adapted to receive signals in a third sub-band frequency range of about 550 MHz to about 825 MHz; and
   a fourth sub-band circuit adapted to receive signals in a fourth sub-band frequency range of about 825 MHz to about 1.2 GHz.

4. The antenna assembly of claim 1, wherein the monopole antenna is configured to receive signals in a frequency range of about 300 MHz to 1.2 GHz and the loop antenna is configured to extend the frequency range to about 150 MHz.

5. An instrument system comprising:
   a transmitter device configured to be secured to a port of a cable television network, the transmitter device operable to generate and transmit signals in a number of different frequency sub-bands across a frequency range of about 100 MHz to about 1.2 GHz; and
   a test instrument connected to an antenna assembly, the antenna assembly comprising:
      an antenna; and
      a plurality of sub-band circuits connected to the antenna via a first switching circuit, each sub-band circuit being configured to receive signals from the antenna in a respective sub-band of the frequency sub-bands and supply the received signals via a second switching circuit to the test instrument connected to the antenna assembly.

6. The instrument system of claim 5, wherein the test instrument is operable to scan the frequency sub-bands and determine a leakage amplitude and frequency.

7. The instrument system of claim 5, wherein the transmitter device is further configured to modulate the generated signals with tag signals.

8. The instrument system of claim 7, wherein the tag signals have a frequency of about 20 Hz.

9. The instrument system of claim 5, wherein the transmitter device comprises a comb generator adapted to produce output signals at multiple harmonics over the frequency range.

10. The instrument system of claim 9, wherein the harmonics output by the comb generator include signals at multiples of about 138 MHz.

11. The instrument system of claim 9, wherein the transmitter device further comprises a tilt correction circuit adapted to adjust the signals provided by the comb generator to make them substantially flat across the frequency range.

12. The instrument system of claim 11, wherein the transmitter device further comprises a modulator coupled to the output of the tilt correction circuit, said modulator configured to modulate signals output from the tilt correction circuit with tag signals.

13. The instrument system of claim 12, wherein the transmitter device further comprises:
   an amplifier coupled to an output of the modulator to add gain to the modulated signals output from the tilt correction circuit with tag signals; and
   a pad coupled to an output of the amplifier and being adjustable to add a high power offset to signals output by the amplifier.

* * * * *